United States Patent
Muth (10) Patent No.: US 9,419,843 B2
(45) Date of Patent: Aug. 16, 2016

(54) CUSTOM ASIC COMBINING VOIP AND SECURITY IP

(75) Inventor: James M. Muth, Santa Ana, CA (US)

(73) Assignee: BROADCOM CORPORATION, Irvine, CA (US)

( * ) Notice: Subject to any disclaimer, the term of this patent is extended or adjusted under 35 U.S.C. 154(b) by 1193 days.

(21) Appl. No.: 11/482,591

(22) Filed: Jul. 6, 2006

(65) Prior Publication Data

US 2008/0040419 A1 Feb. 14, 2008

(51) Int. Cl.
*H04L 29/04* (2006.01)
*H04L 29/06* (2006.01)

(52) U.S. Cl.
CPC ...... *H04L 29/06027* (2013.01); *H04L 65/1026* (2013.01); *H04L 65/1036* (2013.01); *H04L 65/607* (2013.01); *H04L 29/06088* (2013.01); *H04L 65/10* (2013.01); *H04L 65/60* (2013.01)

(58) Field of Classification Search
CPC .............. H04L 29/06027; H04L 29/04; H04L 29/06088; H04L 65/1036; H04L 65/10; H04L 65/1026; H04L 65/607; H04L 65/60; H04M 7/0024; H04M 7/0027; H04M 7/0039
USPC .............................................. 463/42; 709/203
See application file for complete search history.

(56) References Cited

U.S. PATENT DOCUMENTS

| | | | |
|---|---|---|---|
| 6,241,612 B1 | 6/2001 | Heredia | |
| 6,801,604 B2 * | 10/2004 | Maes et al. | 379/88.17 |
| 6,804,244 B1 * | 10/2004 | Anandakumar et al. | 370/395.21 |
| 6,904,037 B2 | 6/2005 | Oran et al. | |
| 7,303,474 B2 * | 12/2007 | Anderson et al. | 463/42 |
| 2003/0055984 A1 * | 3/2003 | Shimakawa et al. | 709/227 |
| 2003/0202506 A1 * | 10/2003 | Perkins et al. | 370/352 |
| 2004/0063497 A1 * | 4/2004 | Gould | 463/42 |
| 2004/0109023 A1 * | 6/2004 | Tsuchiya | A63F 13/12 715/758 |
| 2004/0246679 A1 * | 12/2004 | Cromwell | H01L 23/4006 361/704 |

(Continued)

FOREIGN PATENT DOCUMENTS

| | | | |
|---|---|---|---|
| KR | 2007042747 A | * | 4/2007 |
| TW | 329567 | | 4/1998 |

(Continued)

OTHER PUBLICATIONS

"Application-specific integrated circuit", Wikipedia, Jun. 24, 2005. http://web.archive.org/web/20050624012908/http://en.wikipedia.org/wiki/Application-specific_integrated_circuit.*

(Continued)

*Primary Examiner* — Werner Garner
(74) *Attorney, Agent, or Firm* — McDermott Will & Emery LLP (57) ABSTRACT

A custom Application-Specific Integrated Circuit ("ASIC") that simultaneously processes data packets and multimedia packets, including Voice over Internet Protocol ("VoIP") packets, that are transmitted by a plurality of clients connected to a central server over a network, such as the Internet, and that are also transmitted by the central server to the plurality of servers. The custom ASIC may be configured to restrict the receipt of both the multimedia and the data packets to selected, predetermined clients connected to the central server and prevent the receipt of such packets by non-authorized clients. A method of processing data packets and multimedia packets, including VoIP packets, and a system utilizing the custom ASIC are also provided.

24 Claims, 4 Drawing Sheets

(56) References Cited

U.S. PATENT DOCUMENTS

| | | |
|---|---|---|
| 2005/0013292 A1* | 1/2005 | Johnson et al. ............... 370/352 |
| 2005/0181872 A1* | 8/2005 | Acharya et al. ................ 463/35 |
| 2005/0246449 A1* | 11/2005 | Fujisawa et al. ............. 709/230 |
| 2006/0035712 A1* | 2/2006 | Eastman et al. ................ 463/42 |
| 2006/0115699 A1 | 6/2006 | Matsuoka |
| 2007/0026276 A1 | 2/2007 | Ogawa et al. |
| 2007/0087242 A1 | 4/2007 | Hwang et al. |
| 2007/0110053 A1* | 5/2007 | Soni et al. ..................... 370/389 |
| 2007/0201449 A1* | 8/2007 | Restrick, Jr. ...... H04L 29/06027 370/356 |

FOREIGN PATENT DOCUMENTS

| | | |
|---|---|---|
| TW | 335581 | 7/1998 |
| TW | 536882 | 6/2003 |
| TW | 567332 B | 12/2003 |
| TW | I234309 | 6/2005 |
| TW | 200626920 | 8/2006 |
| WO | WO-2004/055928 A2 | 7/2004 |
| WO | WO-2006/024933 A2 | 3/2006 |

OTHER PUBLICATIONS

Becker, David and Ben Charney, "Playing games with VoIP", Feb. 5, 2004, CNET News, available at <http://news.cnet.com/2100-7352-5154140.html>.*

Machine translation of Kang, KR 2007042747 A filed on Oct. 19, 2005.*

* cited by examiner

CUSTOM ASIC COMBINING VOIP AND SECURITY IP

BACKGROUND OF THE INVENTION

1. Field of Invention

The invention relates to online computer gaming and in particular, to a system and a method for providing Voice over Internet Protocol ("VoIP") capability for interactive, multi-player online computer gaming.

2. Related Art

In general, the term "online gaming" refers to video games that are played over some form of network, most commonly the Internet. The expansion of online gaming has coincided with the overall expansion of the Internet. Online games can range from simple text-based games to games incorporating complex graphics and virtual worlds populated by many players simultaneously. Many different styles of play are available online. Many online games have associated online communities, making online games a form of social activity that extends beyond single player games.

Initially, online gaming started with single player games using various LAN protocols with minimal sharing between users, for example, the sharing of high score listings. Later, online gaming moved onto the Internet using the TCP/IP protocol, and with the growth of broadband Internet access, the types of online games playable over the Internet have greatly expanded. Massively multi-player online games were made possible with expanding Internet access, using the Internet to allow literally hundreds of players to play the same game together.

In a multi-player game, multiple persons may play the same game at the same time. Unlike single-player games that create artificial opponents, in multi-player games, players may either all compete against each other, or team up to achieve a common goal such as defeating an enemy that may consist of either computer or human players. Usually multi-player games either use computer networking to allow players to play together or require the players to gather around a single game system to play.

Online games may be either single-session, i.e., very little information is saved between game sessions. In persistent-world multi-player games, known as Massively Multi-player ("MMP") games, the game world is stored between sessions. Examples of different styles of MMP games are: MMORPG (Massively multi-player online role-playing game); MMORTS (Massively multi-player online real-time strategy), and MMOFPS (Massively multi-player online first-person shooter).

In virtually all cases, MMP games today are enabled by a central server. Clients connect to this central server or a central server array, where the client systems are either home-level desktop systems such as a Windows-based personal computer ("PC") (or a Mac) or game consoles, such as Sony's PlayStation2™, Microsoft's Xbox 360™, and Nintendo's GameCube™. The central server is responsible for interpreting the actions of the clients, maintaining consistency, and passing information among the clients.

Figure 1:
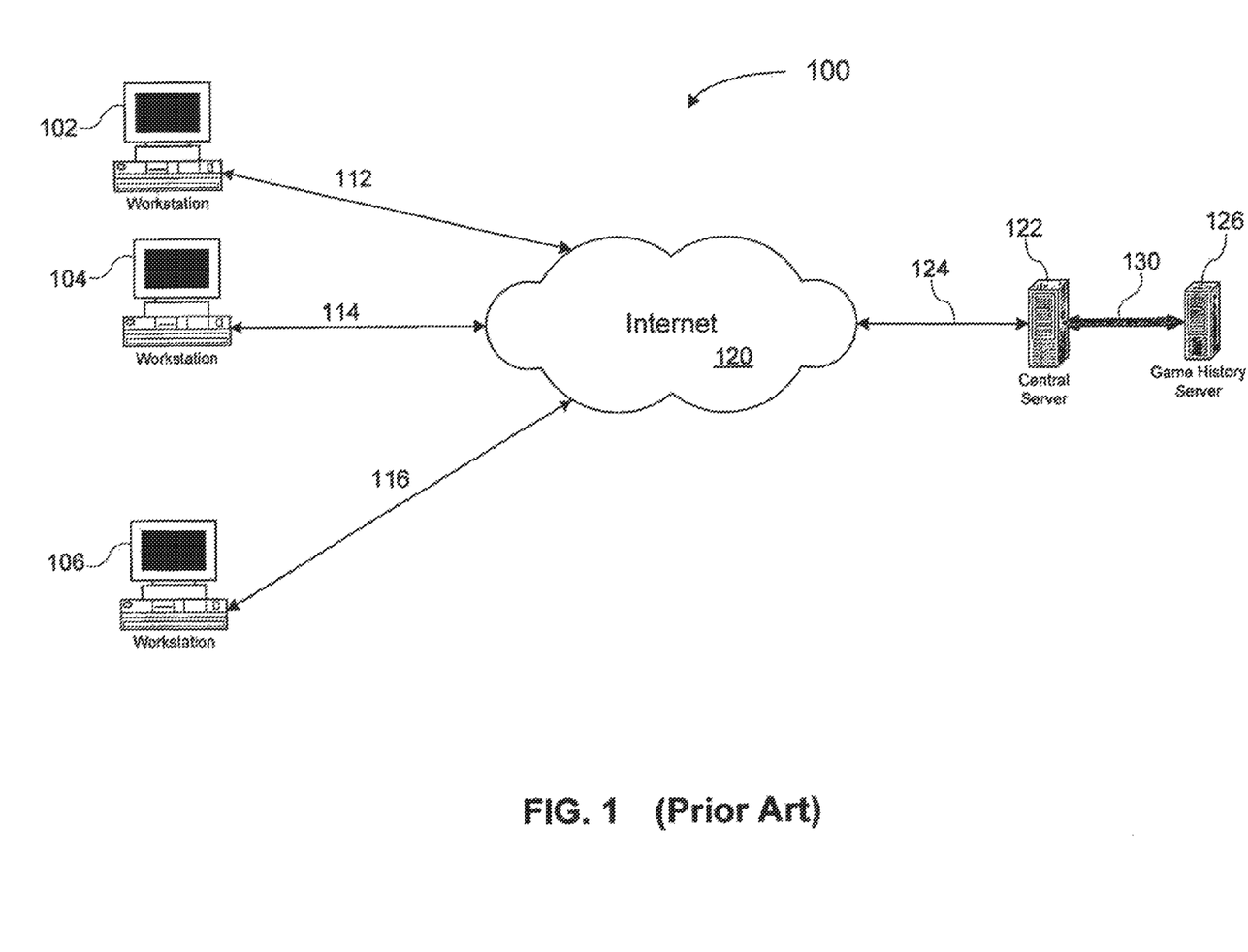
FIG. 1 shows a block diagram illustrating the basic network elements of a conventional MMP gaming system.

FIG. 1 shows a block diagram of the basic network elements of a conventional MMP gaming system. In MMP gaming system 100, 3 players or "gamers" are online and playing an MMP game. The workstations 102, 104, and 106 of the 3 players connect to the Internet 120 via links 112, 114, and 116, respectively. From the Internet 120, a connection 124 is made to the central gaming server 122. The central gaming server 122 may be in signal connection via bus 130 with a game history server 126 that may store game histories from all games presently being hosted by the central gaming server 122. The clients 102, 104, and 106 communicate only with the central gaming server 122 and the central gaming server 122 executes client actions and notifies other clients accordingly.

A variety of multi-player games exist with different characteristics and demands varying from simple card games, up to role-playing environments with many users. Being able to support hundreds and eventually thousands of users opens up additional opportunities for interaction and may enable new games or other online multi-person experiences (e.g., a virtual world where hundreds of players interact, simulating real-life-scale experiences).

The growth of broadband Internet access has also given rise to an ever expanding use of VoIP technology. In general, VoIP or Internet telephony refers to communication services—voice, facsimile, and/or voice-messaging applications—that are transported over the Internet, rather than over the public switched telephone network ("PSTN"). The basic steps involved in originating an Internet telephone call are conversion of an analog voice signal to a digital format and then compression/translation of the digital signal into Internet protocol ("IP") packets for transmission over the Internet, with the process being reversed at the receiving end.

Although progressing rapidly, Internet telephony still has some problems with reliability and sound quality relative to the PSTN, due primarily to limitations both in Internet bandwidth and current compression technology. However, Internet telephony presents the opportunity of adding voice communication to data communication between clients participating in online MMP games. As an example, where multiple players in MMP games are competing as a team against other teams, for example, as one combat team against other teams, the exchange of audio information between team members to the exclusion of members of other teams, has the potential to make the online games more realistic, more challenging, and more entertaining.

Therefore, there is a need for a system and a method to combine the simultaneous transmission of data and voice between clients and servers in an online gaming environment.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and a method for connecting multiple devices in a client-server environment and seamlessly transmitting both data and voice between the devices, substantially as shown in and/or described in connection with at least one of the following figures, as set forth more completely in the claims is disclosed.

Various advantages, aspects and novel features of the present invention, as well as details of an illustrated embodiment thereof, will be more fully understood from the following description and drawings.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of various alternative implementations, reference is made to the accompanying drawings that form a part hereof, and in which is shown by way of illustration a specific implementation in which the invention may be practiced. It is to be understood that other implementations may be utilized and structural changes may be made without departing from the spirit and scope of this invention.

The invention is described with reference to various functional block diagrams, which illustrate possible applications of and embodiments of the invention from a functional perspective. These functional block diagrams should not be interpreted to imply or otherwise require a particular physical architecture in accordance with the partitioning of the functionality depicted therein. Instead, it will be appreciated by one of ordinary skill in the art that various alternative physical architectures (whether hardware, software or a combination thereof) may be used to implement the described functionality. For example, the invention may be implemented using various hardware and software components, including, for example, using a semiconductor integrated circuit (e.g., a chip) or a combination of semiconductor integrated circuits (e.g., a chipset or multi-chip module), or in associated circuitry, or in the software, firmware, protocol stacks, libraries, algorithms or other processes operating thereon (or in any configuration of one or more of the foregoing). The chip or chipset implementation may include an integrated circuit, including, for example, any of the following alone or in combination: an application specific integrated circuit ("ASIC"), a digital signal processor ("DSP"), or another general-purpose or specific-purpose processor, and associated circuitry (e.g., memory, co-processors, busses, etc.).

In general, a custom Application-Specific Integrated Circuit ("ASIC") for embedding VoIP packets into streaming data packets for transmission to a central server hosting an MMP game application utilized in a VoIP/gaming system is disclosed. The custom ASIC may be also configured to receive VoIP packets embedded with streaming data packets from the central server and to filter the VoIP packets so that only certain predetermined users are able to receive and hear voice communications from the other players. As an example implementation, the custom ASIC may be embedded in a video gaming card used in a PC or may be a separate component used in a PC or a game console. In another example implementation, the custom ASIC may be a component in a configurable System-On-a-Chip ("SoC") platform, such as a set-top box ("STB"), a device configured to process concurrent streams of audio and video data associated with broadband multimedia services, as well as network packets processed in support of high-speed Internet access.

As an example of the processes that may be performed by the custom ASIC, it may include an integrator module that acts as an interface and receives both data and voice packets from a user and integrates these streams for transmission to a central server. The custom ASIC may also include a routing module that acts as an interface to the central server and receives voice packets embedded into a stream of data packets from the central server over an Internet connection, another module that determines the type of packet received, and if a voice packet is found, then determines through a unique identifier code if the voice packet is intended for its user, and either accepts or rejects the voice packets responsive to this determination. The custom ASIC may also contain an outgoing module that encodes voice packets for transmission to the central server with a unique identifier, as well as ranking the priority of the various packets and scheduling their transmission according to certain predetermined priorities.

Figure 2:
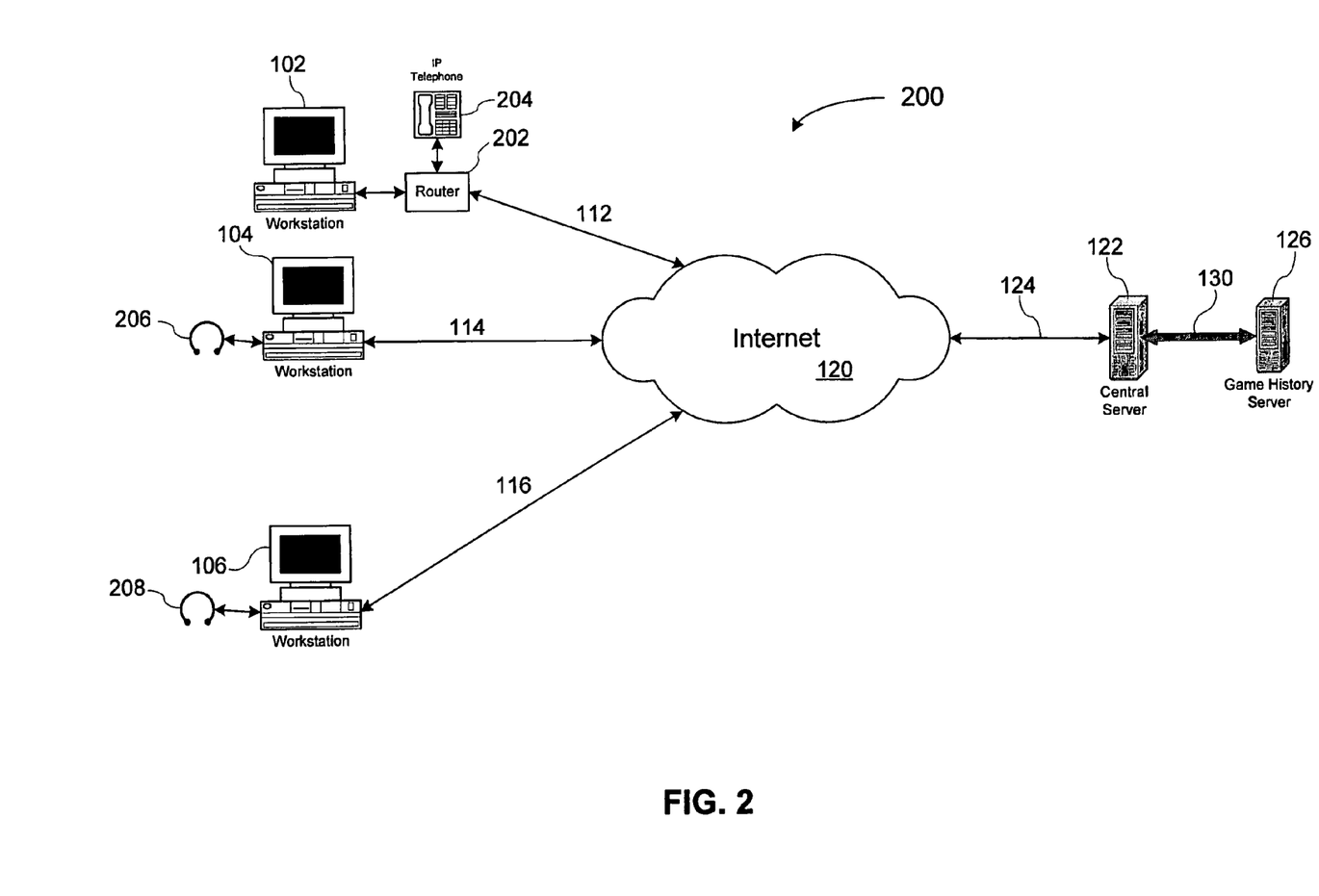
FIG. 2 shows a block diagram illustrating the basic network elements of an example implementation of an MMP gaming system that includes a custom ASIC that provides VoIP capability to the gaming system, together with IP security for voice communications.

In FIG. 2, a block diagram illustrating the basic network elements of a MMP gaming system that includes VoIP capability integrated into the gaming system, is shown. As in FIG. 1, 3 players or "gamers" are online and playing on MMP gaming system 200. The workstations 102, 104, and 106 of the 3 players connect to the Internet 120 via links 112, 114, and 116, respectively. From the Internet 120, a connection 124 is made to the central gaming server 122. The central gaming server 122 may be in signal communication via bus 130 with a game history server 126 that may store game histories from all games presently being hosted by the central gaming server 122. The clients 102, 104, and 106 communicate only with the central gaming server 122 and the central gaming server 122 executes client actions and notifies other clients accordingly.

In MMP gaming system 200, a VoIP capability is integrated into the gaming system. IP telephony may be implemented in several ways. In one such configuration, the Internet connection, link 112, is to broadband router 202, and from the broadband router 202, there are connections to the workstation 102 and an IP telephone 204, which will act and perform like a regular PSTN phone. In an alternative configuration, using a so-called "softphone," software may be downloaded into workstations 104 and 106 that may, for example, have an interface that includes a telephone keypad displayed on the monitor. Rather than an IP telephone, the user may speak into and listen over a computer headset with a microphone 206 and 208.

In an example of operation of MMP gaming system 200, the users of workstations 102 and 106 may be on the same team. Therefore, these 2 users will be able to communicate over the MMP gaming system 200 with each other, without the user of workstation 104 being able to hear their communications. Conversely, the user of workstation 104 may be a member of a competing team with other users (not shown) and the voice communications between these team members will also be secure and not accessible to non-members.

Figure 3:
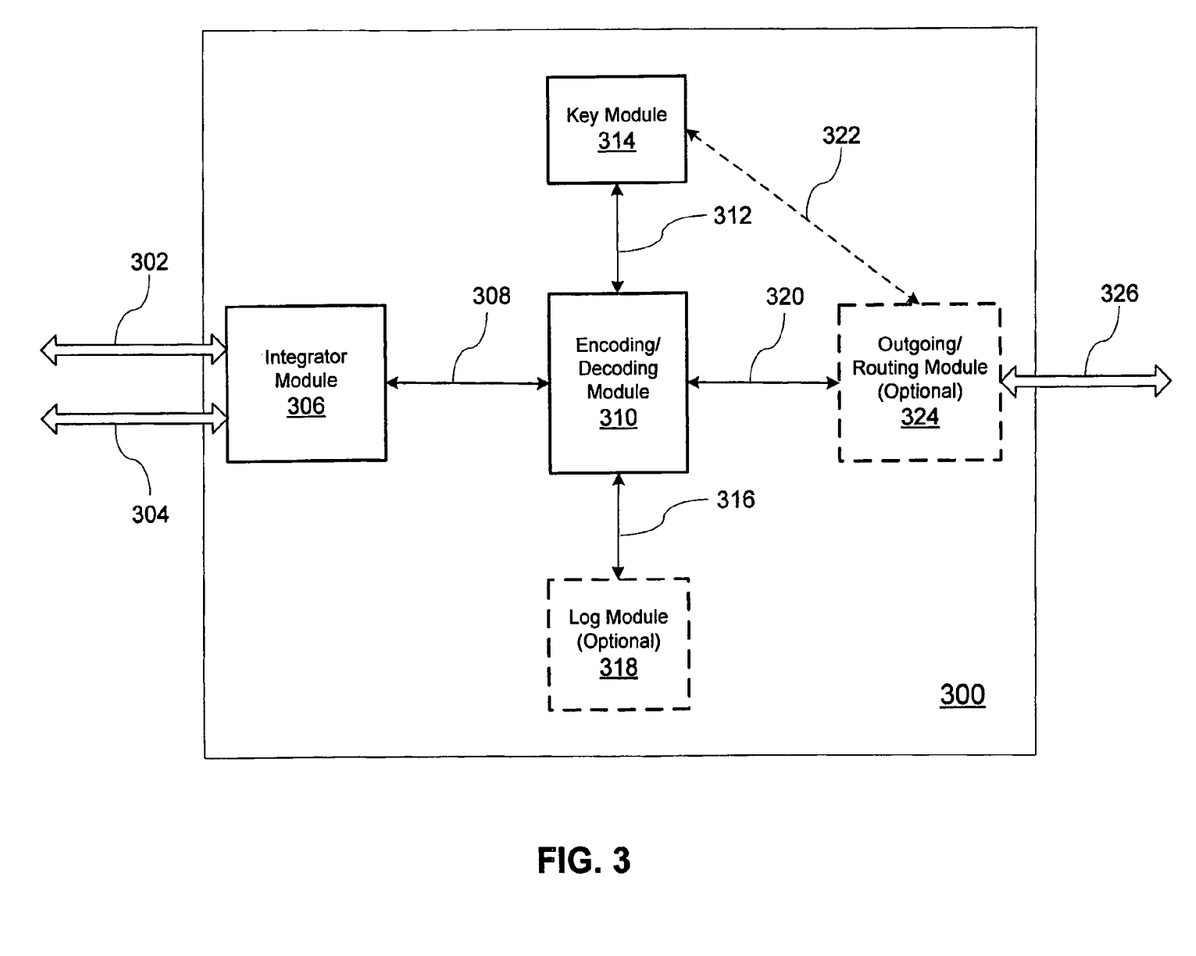
FIG. 3 shows a block diagram illustrating an example implementation of a custom ASIC combining VoIP and IP security.

In FIG. 3, a block diagram illustrating an example of an implementation of a custom ASIC 300 combining streaming data and streaming VoIP, together with IP security for the streaming VoIP, for use in an online gaming environment is shown. In general, the custom ASIC combining VoIP and IP security ("ASIC-VoIP") 300 processes streaming data packets together with VoIP packets for use in the online gaming environment. In FIG. 3, ASIC-VoIP 300 is in signal communication with the user who may be participating in an MMP online game, through communication links 302 and 304. In general, the data packets generated by the user's internet device (e.g., a PC or a game console) and VoIP packets are received at the ASIC-VoIP 300, processed and then transmitted to a central server (not shown) via communication link 326.

Whenever the user interacts with game, e.g., inputs responses through a mouse or a game console, packets of data (streams) pass over communication link 302 to integrator module 306 of the ASIC-VoIP 300, which acts as an interface to the user. At the same time, the user may also communicate with a team member over a headset while playing the game, in which case VoIP packets also pass over communication link 304 to integrator module 306.

Thus, in general the integrator module 306 is configured to enable the ASIC-VoIP 300 to receive packets of data (streams) that may originate from various multimedia and data sources, including IP telephony. From the integrator module 306, the data packets and the VoIP packets are transmitted to the encoding/decoding module 310 via communication link 308. The encoding/decoding module 310 may be configured to encode the packets with identifiers that differentiate each packet from the others based on predetermined criteria. As an example of operation, the encoding/decoding module 310 may attach an identifier, such as the IP address of the user's IP telephone, to any VoIP packets being transmitted through the encoding/decoding module 310. Thus when the VoIP packet arrives at the central server (not shown), the central server, which may be configured to identify the user sending the VoIP packet using stored data, may then determine the other users authorized to receive the VoIP packet and in turn transmit the VoIP packet to the appropriate user.

Additionally, there may be levels of communication between team members. That is, each team may be further subdivided into two or more levels where the receipt of messages are further restricted within levels of the team, which may be configured through the entry of parameters into the key module 314. It is also appreciated by those skilled in the art that the restriction of the transmission of data packets may also be implemented by attaching keys or codes to headers on the packets, based on criteria input into the ASIC-VoIP 300 that may be stored in either the key module 314 or the optional log module 318.

The ASIC-VoIP 300 may also contain an optional outgoing/routing module 324 that receives data and VoIP packets via connection link 320 and transmits the data and VoIP packets to the central server (not shown) via connection link 326. As an alternative to the central server receiving and routing VoIP packets, the outgoing/routing module 324 may generate additional VoIP packets using data prestored in the key module 314. As an example of operation, the key module 314, which may be in signal communication with the encoding/decoding module 310 via communication link 312, may contain unique identifiers that apply to the user's other team members and a separate VoIP packet may be generated for each such member. The outgoing/routing module 324 may also be configured so that while all data packets must go directly to the central server for processing, with the proper responses being returned to the appropriate users, VoIP packets may bypass the central server and be routed directly to each designated user. It will be appreciated by one of ordinary skill in the art that other functions may be performed by the outgoing/routing module 324, such as assigning priorities to packets, storing packets in cache, and re-sequencing the transmission of the packets.

Incoming packets from the central sever (not shown) may be received and transmitted as appropriate to the user's PC or game console, as the case may be, or to the user's IP phone. As noted above, the ASIC-VoIP 300 may be configured to classify and restrict the transmission of data and VoIP packets, in which case the incoming packets may be transmitted to the encoding/decoding module 310 for a determination of the ultimate source of the packets. In an example implementation, codes and identifiers may have been attached to the packets when they were transmitted to the ASIC-VoIP 300, in which case, incoming packets may be examined by the encoding/decoding module 310 to determine the type of packet, e.g., the intended recipient, the classification level of the data, etc. In other implementations, codes and identifiers may also have been inserted by the central server and may also be decoded by the encoding/decoding module 310. The ASIC-VoIP 300 may also contain an optional log module 318 in signal communication with the encoding/decoding module 310 via communication link 316. Log module 318 may store game histories, team member information, and any other data or information that may need to be saved and retrieved for later sessions.

Figure 4:
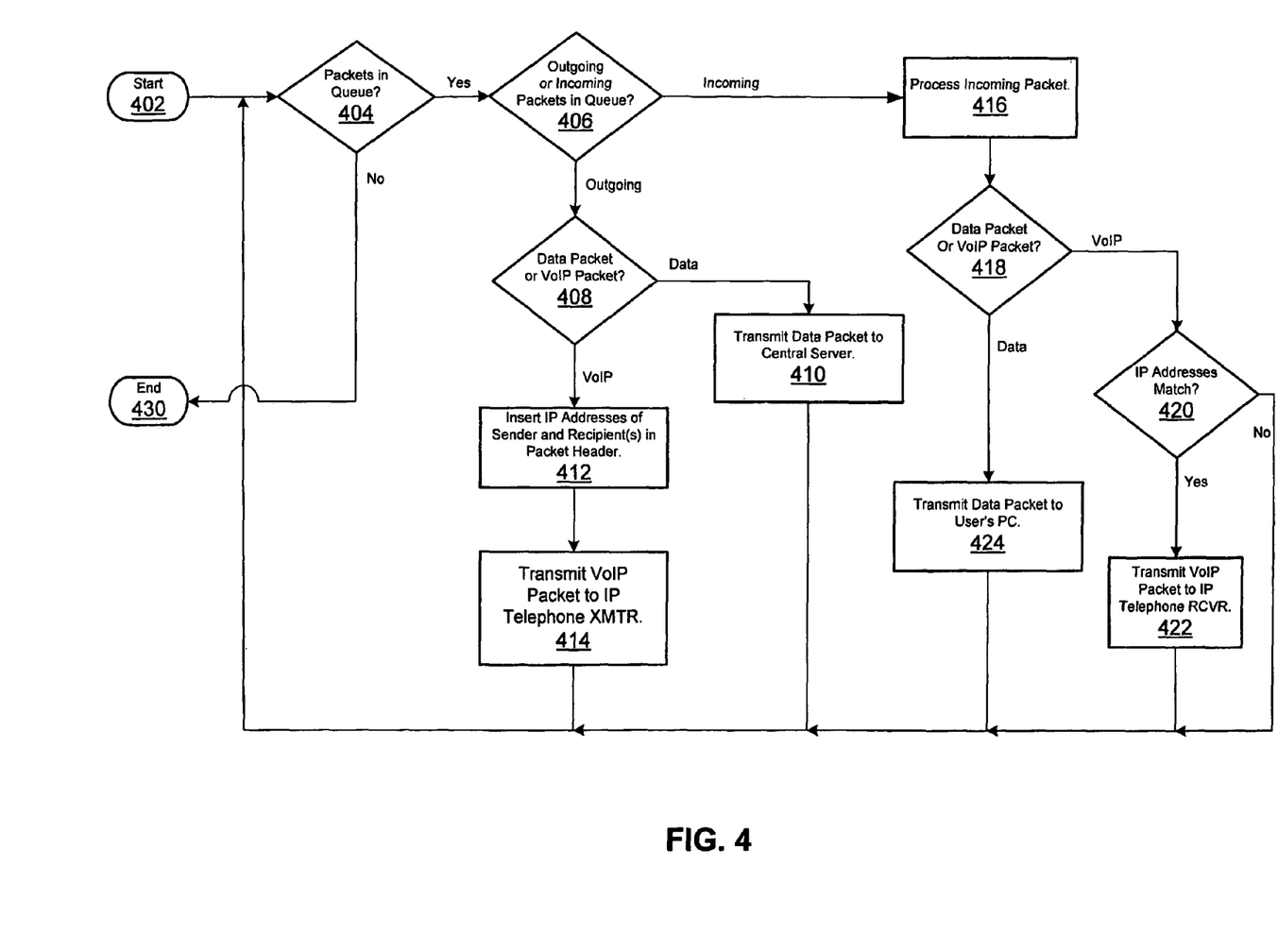
FIG. 4 shows a flowchart illustrating an example of a method for integrating VoIP capability into an online gaming system using a custom ASIC that is used in a user's device, such as a PC, workstation or game console, that gives the user access to a network.

In FIG. 4, a flowchart illustrating an example of a method for integrating VoIP capability into an online gaming system using a custom ASIC is shown. In an example implementation, an ASIC-VoIP may be embedded in a user's device, such as a PC, workstation or game console, that gives the user access to a network. The ASIC-VoIP may be a separate component or may be attached to a video or game card as an additional component on a chipset or a System-on-a-Chip ("SoC"). In general, each ASIC-VoIP may perform the same basic functions as described above, but each ASIC-VoIP may also be customized to interface with the available platforms used in online gaming, e.g., PCs with various operating systems, PlayStation2™, Xbox 360™, GameCube™, etc. Additionally, some of these basic functions may be implemented in modules that are present on the central server, thus reducing the number of transmissions made in the distributed system.

The example process 400 starts in step 402. In decision step 404, a check is made to see if there are any packets to be processed by the ASIC-VoIP 300, FIG. 3. If there are none, the process ends in step 430. Otherwise, in decision step 406, a determination is made as to whether the packet to be processed is an incoming or an outgoing packet.

In the case of an incoming packet from a central server, i.e., data or VoIP packets received by the Outgoing/Routing module 324 of ASIC-VoIP 300, FIG. 3, via communication link 326, its processing begins in step 416. In decision step 418, a determination is made as to whether the packet is a data packet or a VoIP packet. In the case of a VoIP packet, in decision step 420, a determination is made whether the IP address in the VoIP packet matches the IP address of the user of this particular ASIC-VoIP 300. If it does, the VoIP is the transmitted to the receiver of the user's IP telephone. Otherwise, the VoIP packet is bypassed and the process returns to decision step 404.

In the case of an outgoing packet to the central server, in decision step 408, a determination is again made as to whether the packet is a data packet or a VoIP packet. In the case of a VoIP packet, in step 412, the IP address of the user's IP telephone may be embedded, for example, in a header attached to the VoIP packet, together with the IP addresses of the user's team members taken from the Key module 314, FIG. 3, and in step 414, the VoIP packet may be transmitted to the user's IP telephone transmitter. In the case of a data packet, this packet may be transmitted directly to the central server to which the user is connected in step 410. In another example of an implementation, the VoIP packets may also be transmitted to the central server, which may then either broadcast or multicast these VoIP packets to the appropriate users. Thereafter, the process returns to step 404 to check for additional packets to be processed. When there are no further packets, the process ends at step 430.

While the foregoing description refers to the use of a custom ASIC in an online MMP gaming environment wherein VoIP capability is seamlessly integrated into an MMP online game, the subject matter is not limited to the use of the custom ASIC in the gaming environment only. Any online, real-time multiple-user distributed system that could benefit from the functionality provided by the custom ASIC described above may be implemented to include the custom ASIC to combine VoIP capability with any distributed system that may benefit from the added VoIP capability.

Persons skilled in the art will also understand and appreciate that one or more processes, sub-processes, or process steps described above may be performed by hardware and/or software. Additionally, the system may be implemented completely in software that would be executed within a microprocessor, a general purpose processor, a combination of processors, a digital signal processor ("DSP"), and/or one or more ASICs. If the process is performed by software, the software may reside in software memory in the controller. The software in software memory may include an ordered listing of executable instructions for implementing logical functions (i.e., "logic" that may be implemented either in digital form such as digital circuitry or source code or in analog form such as analog circuitry or an analog source such as an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

While various preferred and alternative embodiments of the present intention are described herein, it will be apparent to one of ordinary skill in the art after reading this description that there are various modifications and extensions of the above described technology that may be implemented using these teachings without departing from the spirit and scope of the present invention, the breadth and scope of which shall be defined by following claims.

What is claimed is:

1. An Application-Specific Integrated Circuit (ASIC) comprising:
    an integrator module configured to receive data packets via a first communication link and Voice-over-Internet-Protocol (VoIP) packets via a second communication link, the integrator module being operable to integrate the data packets and the VoIP packets into a stream, the integrator module being operable to transmit the stream containing the data packets and the VoIP packets over a third communication link;
    an encoding and decoding module configured to receive the stream containing the data packets and the VoIP packets from the integrator module via the third communication link, the encoding and decoding module being operable to encode the data packets from the stream and the VoIP packets from the stream to generate an encoded stream containing encoded data packets and encoded VoIP packets; and
    an outgoing and routing module configured to receive the encoded stream and transmit the encoded stream to a central server.

2. The ASIC of claim 1, where:
    the outgoing and routing module is further configured to receive additional encoded data packets and additional encoded VoIP packets from the central server and to transmit the additional encoded data packets and the additional encoded VoIP packets to the encoding and decoding module; and
    the encoding and decoding module is further configured to decode the additional encoded data packets and the additional encoded VoIP packets received from the outgoing and routing module to generate decoded data packets and decoded VoIP packets, and to transmit the decoded data packets and the decoded VoIP packets responsive to the decoding.

3. The ASIC of claim 2, where the first communication link is in signal communication with a network device comprising a game console or a personal computer (PC), whereby the network device is enabled to communicate with a plurality of other network devices over a network utilizing the encoded data packets transmitted from the ASIC to the central server and the additional encoded data packets transmitted from the central server to the ASIC.

4. The ASIC of claim 3, where the second communication link is in signal communication with an Internet Protocol (IP) telephone, whereby the IP telephone is enabled to communicate with a plurality of other IP telephones over the network utilizing the encoded VoIP packets transmitted from the ASIC to the central server and the additional encoded VoIP packets transmitted from the central server to the ASIC.

5. The ASIC of claim 4, where the IP telephone is configured to communicate with the other IP telephones connected to the network utilizing the encoded VoIP packets transmitted from the ASIC to a plurality of other ASICs connected to the network.

6. The ASIC of claim 4, further including a key module in signal communication with the encoding and decoding module, where the key module is configured to store a plurality of identifiers utilized by the encoding and decoding module to encode the data packets and the VoIP packets.

7. The ASIC of claim 6, where each of the identifiers stored in the key module is uniquely assigned to a respective IP telephone connected to the network.

8. The ASIC of claim 7, where the ASIC is configured to be programmed by at least one of an entry of the identifiers into the key module or a modification of the identifiers stored in the key module, and where the key module is configured to filter the additional encoded VoIP packets utilizing the identifiers.

9. The ASIC of claim 6, where the identifiers stored in the key module are IP addresses.

10. The ASIC of claim 4, further including a log module in signal communication with the encoding and decoding module, where the log module is configured to store data that is capable of being utilized by the encoding and decoding module to encode the data packets and the VoIP packets.

11. The ASIC of claim 4, wherein the ASIC is configured to operate in a gaming system.

12. The ASIC of claim 1, wherein the encoding and decoding module encodes the data packets and the VoIP packets with security information for generating the encoded stream.

13. A method of exchanging data packets and Voice over Internet Protocol (VoIP) packets, the method being executed in a single Application-Specific Integrated Circuit (ASIC) and comprising:
   receiving the data packets from a network device;
   receiving the VoIP packets from an Internet Protocol (IP) telephone;
   integrating the data packets and the VoIP packets into a data stream;
   encoding the data packets from the data stream and the VoIP packets from the data stream to generate an outgoing data stream containing encoded data packets and encoded VoIP packets;
   transmitting the outgoing data stream to a central server;
   receiving an incoming data stream from the central server, where the incoming data stream includes additional encoded data packets and additional encoded VoIP packets;
   decoding the additional encoded data packets and the additional encoded VoIP packets to generate decoded data packets and decoded VoIP packets;
   transmitting the decoded data packets to the network device; and
   transmitting the decoded VoIP packets to the IP telephone.

14. The method of claim 13, further including associating a transmitting identifier that uniquely identifies the network device with the VoIP packets.

15. The method of claim 14, further including:
   determining another IP telephone designated to receive at least one of the encoded VoIP packets;
   assigning an identifier to the another IP telephone; and
   associating the identifier with the transmitting identifier.

16. The method of claim 14, further comprising inserting at least one receiving identifier into the encoded VoIP packets that uniquely identifies at least one predetermined IP telephone designated to receive the encoded VoIP packets.

17. The method of claim 16, where the transmitting identifier and the at least one receiving identifier are a plurality of IP addresses.

18. The method of claim 16, where decoding the additional encoded VoIP packets includes comparing the transmitting identifier in each of the additional encoded VoIP packets with at least one identifier.

19. The method of claim 18, further including blocking an unrecognized one of the additional encoded VoIP packets if the transmitting identifier does not match the at least one identifier.

20. A network system comprising:
   a plurality of network devices;
   a plurality of Internet Protocol (IP) telephones;
   a plurality of application-specific integrated circuits (ASICs), each of the plurality of ASICs being in signal communication with at least one of the plurality of network devices and at least one of the plurality of IP telephones; and
   a central server in signal communication over a network with each of the plurality of ASICs;
   where each of the plurality of ASICs is configured to:
      receive a plurality of data packets from at least one of the plurality of network devices and a plurality of VoIP packets from at least one of the plurality of IP telephones;
      integrate the plurality of data packets and the plurality of VoIP packets into a stream;
      encode the plurality of data packets from the stream and the plurality of VoIP packets from the stream to generate an encoded data stream containing a plurality of encoded data packets and a plurality of encoded VoIP packets; and
      transmit the encoded data stream to the central server.

21. The network system of claim 20, where each of the plurality of ASICs is further configured to receive a plurality of additional encoded VoIP packets from other ASICs of the plurality of ASICs in the network system.

22. The network system of claim 20, where each of the plurality of ASICs is further configured to receive a plurality of additional encoded data packets and a plurality of additional encoded VoIP packets from the central server.

23. The network system of claim 22, where each of the plurality of ASICs is further configured to encode the plurality of VoIP packets with a plurality of identifiers that identify the IP telephone.

24. The network system of claim 23, where each of the plurality of ASICs is further configured to decode the plurality of additional encoded VoIP packets received from the central server by matching a plurality of first identifiers in the plurality of additional encoded VoIP packets with a plurality of second identifiers stored in the respective one of the plurality of ASICs.

* * * * *